(12) United States Patent  (10) Patent No.: US 8,714,496 B2
Blanchard et al.  (45) Date of Patent: May 6, 2014

(54) CONDUIT HARNESS

(75) Inventors: Jack Blanchard, Bristol (GB); David Routledge, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/159,453

(22) Filed: Jun. 14, 2011

(65) Prior Publication Data

US 2012/0112016 A1 May 10, 2012

(30) Foreign Application Priority Data

Jun. 15, 2010 (GB) .................................. 1009967.9

(51) Int. Cl.
*F16L 3/12* (2006.01)

(52) U.S. Cl.
USPC ............................. 248/74.3; 248/62; 248/65

(58) Field of Classification Search
USPC ............... 24/20 R, 279, 286; 248/49, 56, 58, 248/61–63, 65, 69, 71–73, 74.1, 74.3, 74.4
See application file for complete search history.

(56) References Cited

U.S. PATENT DOCUMENTS

| 1,187,566 | A | | 6/1916 | Taylor | |
| 2,994,499 | A | * | 8/1961 | Waters | 248/74.3 |
| 3,110,465 | A | * | 11/1963 | Sugarman et al. | 248/74.3 |
| 3,254,866 | A | * | 6/1966 | Hamrick | 248/74.3 |
| 3,606,218 | A | * | 9/1971 | Enlund | 248/74.2 |
| 3,606,649 | A | * | 9/1971 | Buttriss | 248/65 |
| 6,910,899 | B1 | * | 6/2005 | Daume | 439/100 |
| 7,258,304 | B2 | * | 8/2007 | Miener | 244/129.1 |
| 2006/0144615 | A1 | | 7/2006 | Girot | |
| 2009/0260196 | A1 | | 10/2009 | Lien | |

FOREIGN PATENT DOCUMENTS

| CN | 201237025 Y | 5/2009 |
| DE | 19509349 C1 | 7/1996 |
| JP | 2001352647 A | 12/2001 |

OTHER PUBLICATIONS

UKIPO Search Report for GB1009967.9, dated Oct. 7, 2010.
Extended European Search Report for 11169664.7-1809/2398122, dated Aug. 16, 2013.

* cited by examiner

*Primary Examiner* — Gwendolyn Baxter

(74) *Attorney, Agent, or Firm* — Lowe Hauptman & Ham, LLP

(57) ABSTRACT

A conduit harness has an inner part and an outer part which are snap-fitted together to provide redundancy in the event of failure of either part.

15 Claims, 3 Drawing Sheets

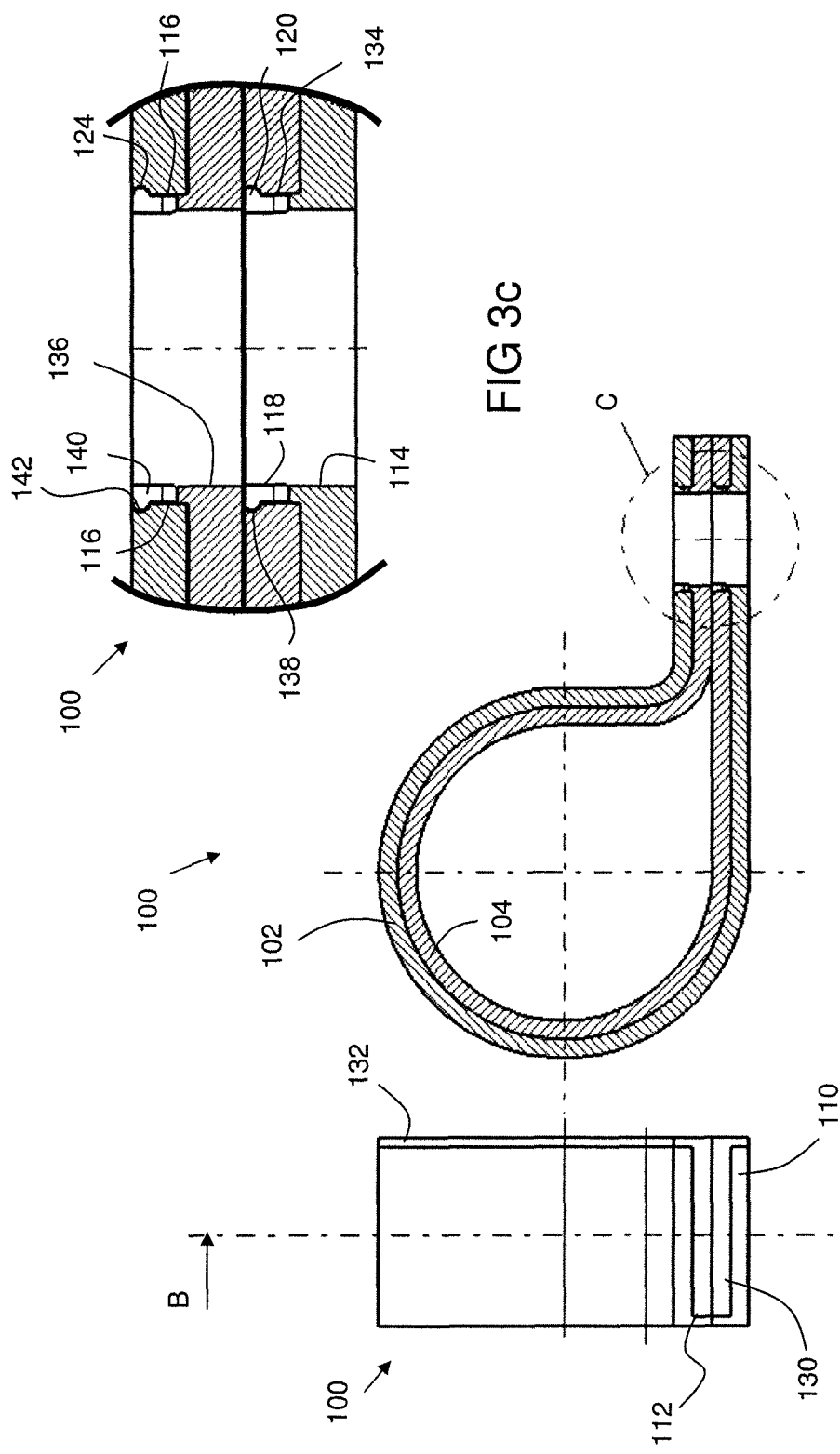

CONDUIT HARNESS

RELATED APPLICATIONS

The present application is based on, and claims priority from, British Application Number GB1009967.9, filed Jun. 15, 2010, the disclosure of which is hereby incorporated by reference herein in its entirety.

The present invention relates to a conduit harness. Specifically, the present invention relates to an aircraft P-clip type wire harness with inbuilt redundancy.

Aircraft wire looms are attached to an aircraft interior in order to route them from one place to another. Typically, such looms are attached with so-called P-clips. P-clips are formed from a flat strip of material folded back on itself to provide a looped portion to surround the wire loom, and a flange projecting therefrom for attachment (usually by a bolt) to the aircraft interior.

Aircraft design practice specifies that redundancy should be built in to aircraft systems. In the case of P-clips this usually results in twice as many clips as required being installed along the length of the loom. This is undesirable as more holes have to be made in the aircraft structure in order to accommodate the P-clips which inevitably weakens the structure.

It is desirable to attach various other conduits to aircraft structures, such as hydraulic, pneumatic and fuel lines.

It is an aim of the present invention to provide and improved conduit harness.

According to the present invention there is provided an aircraft conduit harness comprising a first part and a second part, each part defining a conduit receiving portion and an attachment formation for attachment to an aircraft component, in which the first part is at least partially surrounded by the second part.

Preferably, the harness comprises a first part comprising a first uninterrupted strip of material having two spaced apart attachment formations, a second part comprising a second uninterrupted strip of material having two spaced apart attachment formations, in which the two attachment formations of the first part and the two attachment formations of the second part are joined at an attachment point such that the first part and the second part define conduit-receiving loops, and in which the first part is at least partially surrounded by the second part.

By "uninterrupted" we mean a continuous piece of material which is not severable by a mechanical join, link or similar.

By "loop" we mean a piece of material which is folded or curved back on itself to form a closed circuit.

Advantageously, by providing a pair of nested parts, components such as P-clips can be constructed with an inbuilt redundancy requiring only a single attachment point.

The two parts are generally separable along their length. In other words they are not Fastened together (with the exception of the attachment point) and are capable of supporting the conduit should the other fail.

Figure 1:
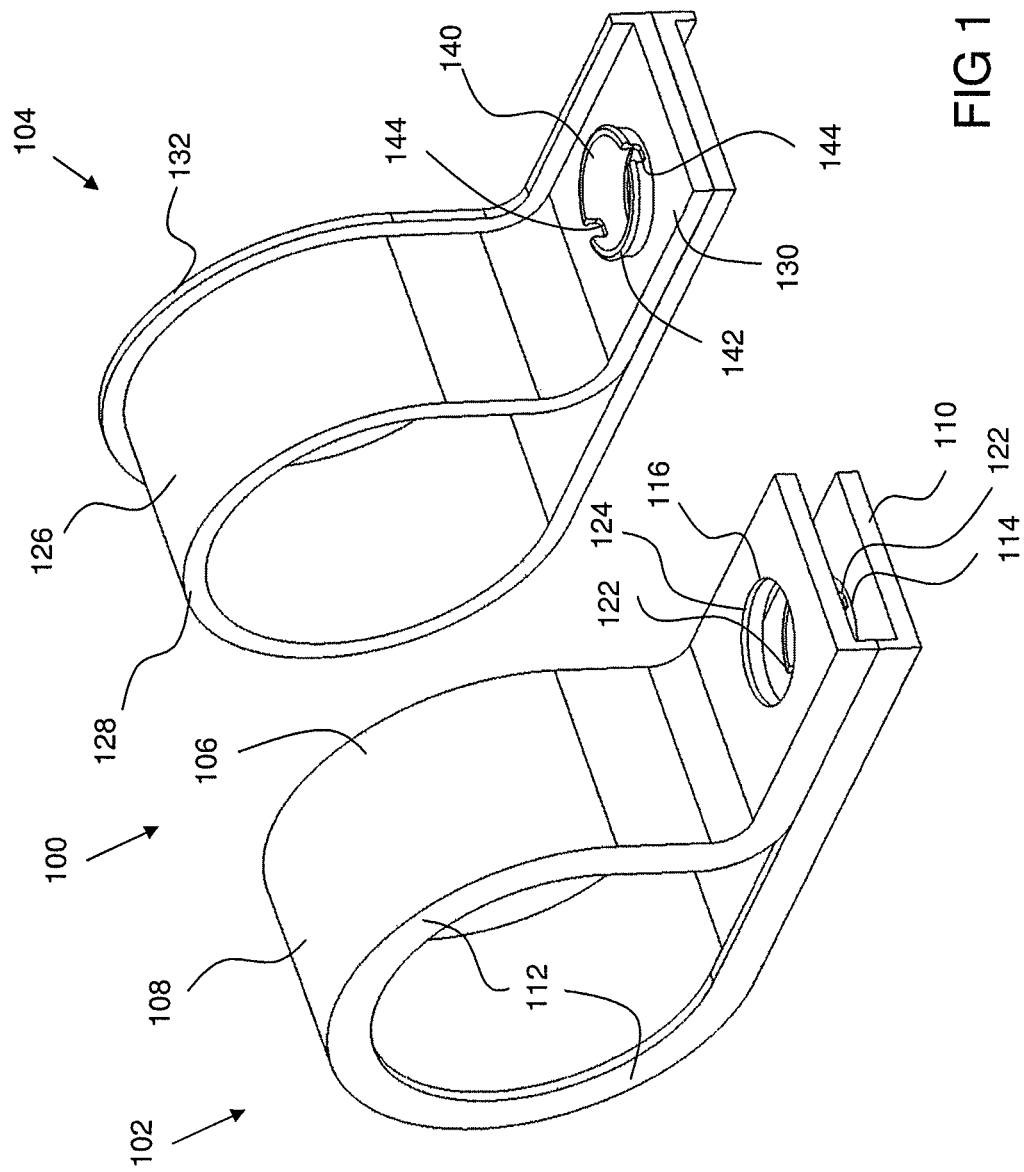
Figure 2:
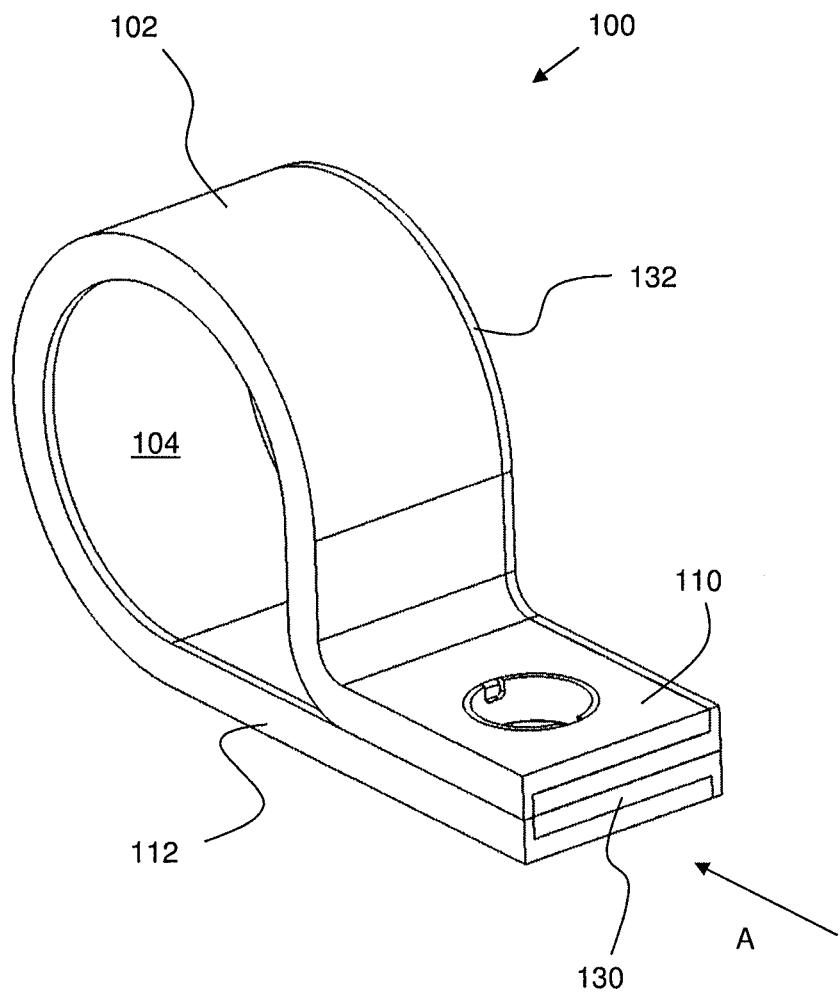

An example conduit harness in accordance with the present invention will now be described with reference to the accompanying drawings in which:

FIG. 1 is an exploded perspective view of a P-clip in accordance with the present invention, FIG. 2 is a perspective view of the P-clip of FIG. 1, FIG. 3a is an end view of the P-clip of FIG. 1 in direction A of FIG. 2, FIG. 3b is a section view of the P-clip of FIG. 1 along B-B of FIG. 3a, and, FIG. 3c is a detail view of the area C of FIG. 3b.

A conduit harness 100 comprises an outer part 102 and an inner part 104.

The outer part 102 is shaped as a continuous flat strip 106 looped over on itself to define a conduit loom receiving loop 108 and a double-thickness attachment formation 110. The inner part also comprises a flange 112 projecting from one side of the strip 106. The strip 106 is looped such that the flange faces inwardly towards the centre of the loop 108 and abuts itself at the attachment portion 110 to leave an offset between the two strip thicknesses of the attachment portion 110.

At an equal distance from each end of the strip 106, bores 114, 116 are defined. The lower bore 114 defines an upstanding flange 118 which projects in the same direction as the flange 112, towards the upper bore 116. The flange 118 is generally tubular and circular in cross section (it is peripheral to the bore 114) and comprises a radially outwardly projecting tongue 120 at its free end. The flange 118 further defines a pair of diametrically opposed axial slots 122 aligned with the direction of the flange 112 (i.e. the long side of the strip 106).

The upper bore 116 defines a circumferential groove 124 at an opposite side of the strip 106 to the flange 112.

The inner part 104 is also shaped as a continuous flat strip 126 looped over on itself to define a wire loom receiving loop 128 and a double-thickness attachment formation 130. The outer part comprises a flange 132 projecting from one side of the strip 126. The strip 126 is looped such that the flange faces outwardly away from the centre of the loop 128 such that the two strip thicknesses of the attachment portion 130 abut.

At an equal distance from each end of the strip 126, bores 134, 136 are defined. The lower bore 134 defines a circumferential groove 138 at an opposite side of the strip 126 to the flange 132.

The upper bore 136 defines an upstanding flange 140 which projects in the same direction as the flange 132, away from the lower bore 134. The flange 140 is generally tubular and circular (it is peripheral to the bore 136) and comprises a radially outwardly projecting tongue 142 at its free end. The flange 140 further defines a pair of diametrically opposed axial slots 144 aligned with the direction of the flange 132 (i.e. the long side of the strip 126).

The harness 100 is assembled as follows. The inner part 104 is places within the outer part 102 such that the edge of the strip 126 opposite the flange 132 abuts the flange 112 of the outer part 102, and the edge of the strip 106 opposite the flange 112 abuts the flange 132.

The flange 118 of the outer part 102 is pressed into the bore 134 of the inner part 104 until the tongue 120 enters the groove 138 as shown in FIG. 3c. Similarly, the flange 140 is inserted into the bore 116 until the tongue 142 engages with the groove 124. The engagement of the tongues 120, 142 and their respective grooves 138, 124 forms a snap-fit engagement as the flanges 118, 140 deform inwardly before resiling when the tongues 120, 142 enter the grooves 138, 124.

Once the harness 100 is assembled, the engaged ends of the strips 106, 126 can be separated to install the harness around a wire loom. The parts 102, 104 will remain together due to the snap-fit. The harness 100 can be secured to an aircraft component with a bolt or other suitable fastener through the aligned bores 114, 116, 134, 136.

If either of the parts 102, 104 fails, the other can perform the function of the harness alone. For example if the outer part 102 fails due to external trauma, the part 104 can support the wire loom alone.

It will be noted that because the strips are uninterrupted, no weak areas or stress concentrations are present in the main part of the loops.

Variations of the above embodiments fall within the scope of the present invention.

As well as being constructed from the same material, the parts 102, 104 may be constructed from different materials, or of material of different mechanical structure (e.g. thickness, composition). For example, the inner part 102 may be constructed from a material with a low coefficient of friction to ameliorate rubbing on the wire loom, whilst the outer part 104 may be constructed from rugged material for strength. What is important is that both parts 102, 104 are each capable of independently supporting the loom should the other fail.

The flanges 118, 140 may be replaced with upstanding fingers, or any other projecting resilient structure. The tongues 120, 142 may be designed so they can be inserted into the grooves, but not removed without breaking them. For example, the lower surfaces of the tongues 120, 142 (i.e. facing the direction of removal) may be perpendicular to that direction, or even tapered to inhibit removal. This will prevent replacement of either part 102, 104 upon failure.

A snap-fit formation may be provided between the abutting part of the strip 126 in order to snap-fit the harness together. The snap fit may be a single-use snap-fit as described above to prevent re-use of the harness 100.

The clip 100 may be used to secure any type of stiff or flexible conduit, such as hydraulic, pneumatic, coolant or fuel conduits.

The invention claimed is:

1. An aircraft conduit harness, comprising:
   a first part comprising a first uninterrupted strip of material having two spaced apart attachment formations,
   a second part comprising a second uninterrupted strip of material having two spaced apart attachment formations,
   in which the two attachment formations of the first part and the two attachment formations of the second part are joined at an attachment point such that the first part and the second part define conduit-receiving loops, and in which the first part is at least partially surrounded by the second part,
   wherein at least one of the attachment formations of the first part defines a first mating formation and at least one of the attachment formations of the second part defines a second mating formation, wherein the first and second mating portions are engageable via a snap-fit, and,
   wherein the first and second parts are of substantially equal width in an axial direction of the loops.

2. An aircraft conduit harness according to claim 1 in which the first and second parts are constructed from generally flat material.

3. An aircraft conduit harness according to claim 2 in which the first part defines a flange projecting perpendicularly from a side thereof to restrict relative movement of the second part.

4. An aircraft conduit harness according to claim 3 in which the second part defines a flange projecting perpendicularly from a side thereof to restrict relative movement of the second part.

5. An aircraft conduit harness according to claim 1 in which the attachment formations comprise a bore defined through the uninterrupted strips of material, in which the mating portions are disposed proximate the periphery of the bores.

6. An aircraft conduit harness according to claim 5 in which one of the first and second mating formations comprises a radially moveable tab engageable with a recess on the other of the first and second mating formations, the tab being configured to resile into the recess upon engagement of the first and second mating formations to secure the first and second mating formations together.

7. An aircraft conduit harness according to claim 6 in which the tab is defined at an end of a resiliently deformable structure projecting from the first or second part.

8. An aircraft conduit harness according to claim 7 in which the resiliently deformable structure is tubular and comprises an open slot about its periphery.

9. An aircraft conduit harness according to claim 1 in which the parts are in the shape of P-clips.

10. An aircraft conduit harness according to claim 1 in which the parts are of substantially equal thickness in a radial direction of the loops.

11. An aircraft conduit harness according to claim 10 in which the parts have substantially the same mechanical and material properties.

12. An aircraft conduit harness according to claim 1 in which the parts are constructed from a plastics material.

13. An aircraft conduit harness according to claim 1 in which the parts are in contact along their length.

14. An aircraft conduit harness comprising:
   a first part comprising a first uninterrupted strip of material having two spaced apart attachment formations,
   a second part comprising a second uninterrupted strip of material having two spaced apart attachment formations,
   in which the two attachment formations of the first part and the two attachment formations of the second part are joined at an attachment point such that the first part and the second part define conduit-receiving loops, and in which the first part is at least partially surrounded by the second part,
   wherein the first and second parts are constructed from a non-conductive material.

15. An aircraft conduit harness according to claim 14 in which the parts are constructed from a plastics material.

* * * * *